April 19, 1955 R. M. CAIN 2,706,637

TAPE-DISC RECORDER

Filed Oct. 3, 1950 8 Sheets-Sheet 1

INVENTOR.
ROBERT M. CAIN
BY Ostrolenk & Faber
ATTORNEYS

April 19, 1955 R. M. CAIN 2,706,637

TAPE-DISC RECORDER

Filed Oct. 3, 1950 8 Sheets-Sheet 2

INVENTOR.
ROBERT M. CAIN
BY Ostrolenk & Faber
ATTORNEYS

April 19, 1955 R. M. CAIN 2,706,637

TAPE-DISC RECORDER

Filed Oct. 3, 1950 8 Sheets-Sheet 3

INVENTOR.
ROBERT M. CAIN
BY Ostrolenk & Faber
ATTORNEYS

April 19, 1955 R. M. CAIN 2,706,637

TAPE-DISC RECORDER

Filed Oct. 3, 1950 8 Sheets-Sheet 4

INVENTOR.
ROBERT M. CAIN
BY Ostrolenk & Faber
ATTORNEYS

April 19, 1955 R. M. CAIN 2,706,637

TAPE-DISC RECORDER

Filed Oct. 3, 1950 8 Sheets-Sheet 5

INVENTOR.
ROBERT M. CAIN
BY Ostrolenk & Faber
ATTORNEYS

April 19, 1955 R. M. CAIN 2,706,637

TAPE-DISC RECORDER

Filed Oct. 3, 1950 8 Sheets-Sheet 6

INVENTOR.
ROBERT M. CAIN
BY Ostrolenk & Faber
ATTORNEYS

April 19, 1955 R. M. CAIN 2,706,637

TAPE-DISC RECORDER

Filed Oct. 3, 1950 8 Sheets-Sheet 7

INVENTOR.
ROBERT M. CAIN
BY Ostrolenk & Faber
ATTORNEYS

April 19, 1955 R. M. CAIN 2,706,637

TAPE-DISC RECORDER

Filed Oct. 3, 1950 8 Sheets-Sheet 8

INVENTOR.
ROBERT M. CAIN

BY
Ostrolenk & Faber
ATTORNEYS

United States Patent Office 2,706,637
Patented Apr. 19, 1955

2,706,637

TAPE-DISC RECORDER

Robert M. Cain, Kalamazoo, Mich., assignor to Wilcox-Gay Corporation, Charlotte, Mich., a corporation of Michigan Application October 3, 1950, Serial No. 188,221

3 Claims. (Cl. 274—4)

My present invention relates to sound recording and reproducing devices and more particularly to a tape recorder and play back mechanism adapted readily to make a record on a magnetizable tape and to play the record back.

In addition, my invention contemplates a combination of a disc recording turntable adapted to play a standard disc record and to make a record on a blank of the stylus or home recording type.

My invention further contemplates a combination of the tape recording device and the disc recording and play back device so that a record on a disc may be copied on a tape and vice versa.

My invention has for one of its more important objects a novel means for tensioning the tape appropriately around a capstan utilizing the capstan to provide the motion of the tape in the recording or play back direction and utilizing oppositely rotating supply and take-up reels in order to maintain appropriate tension on the tape around the capstan.

The oppositely rotating supply and take-up reels are frictionally driven so that they may slip and thereby avoid tearing of the tape while at the same time they maintain appropriate tension of the tape around the capstan so that the tape may move in accordance with the direction of motion of the capstan.

My invention also has for its object the arrangement of the capstan so that it is driven by or is a part of the spindle of the disc recording turntable itself, thereby utilizing the weight of the turntable as a flywheel to obtain a smooth drive for the tape.

Another object of my invention is the arrangement of the take-up and supply reels for the tape in such manner that they may be simultaneously engaged for frictional driving in opposite directions during a recording or play back operation while at the same time they are so arranged that the driving mechanism may be individually engaged and disengaged.

By this means, when the supply reel is engaged to be driven by appropriately operated cam mechanism operating a clutch and the take-up reel is disengaged by the same mechanism, a rapid reverse or rewind operation is obtained; when the take-up reel is engaged to be driven and the supply reel is disengaged, then a rapid forward or winding up operation is obtained. When the clutches of both the supply reel and take-up reel are engaged, then the tape is drawn in opposite directions with substantially equal force except as hereinafter noted, and the net forward motion of the tape is obtained by reason of the fact that the tape is thus pulled tight around the rotating capstan which imparts its own peripheral motion to the tape.

Another object of my invention is the provision of novel clutch shifting members for the tape supply and take-up reels.

Another object of my invention is the provision of a novel recording and play back magnet.

Another object of my invention is the provision of a novel mounting for an erasing magnet.

Another object of my invention is the provision of simplified means for determining the presence or absence of tape before or during a recording, the said means being responsive to the tension of the tape to continue the device in operative condition and being responsive to lack of tension on the tape or absence of tape to place the device in inoperative condition.

These and other objects of the present invention will in part be apparent and in part pointed out in the following description and drawings in which.

Figure 9:
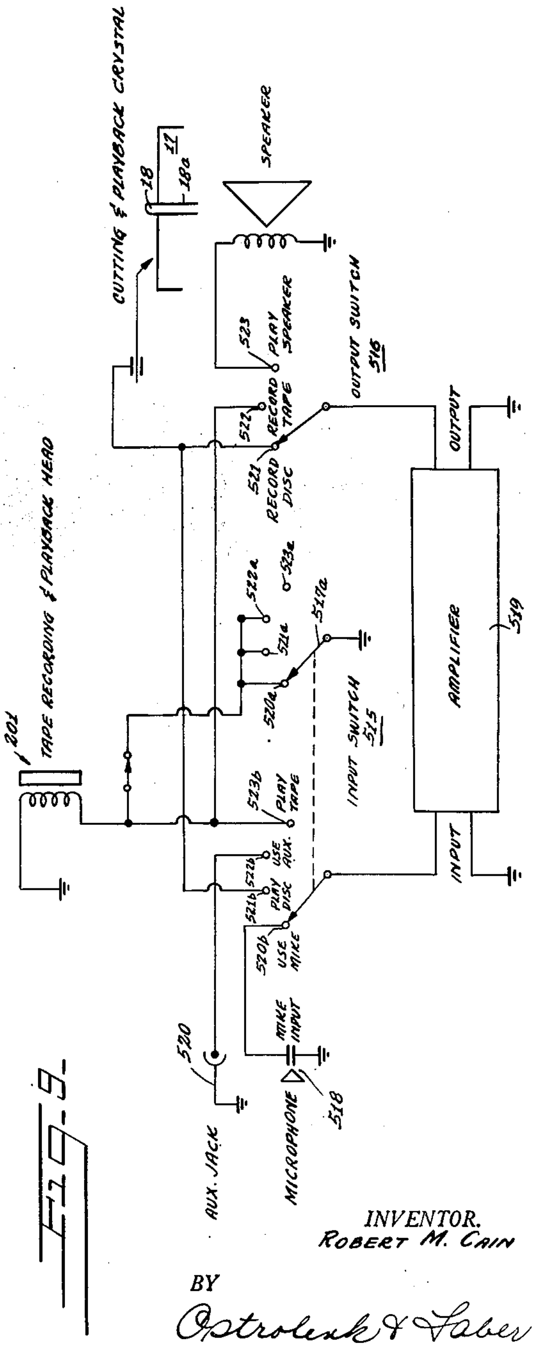
Figure 9 is an electrical circuit diagram showing the electrical connections of the manual switches.

The audio amplifier circuit, the loud speaker, the play back arm and recording arm, and the various electrical controls are shown in block form in Figure 9 since their detail is not essential to a full understanding of the present invention.

Figure 1:
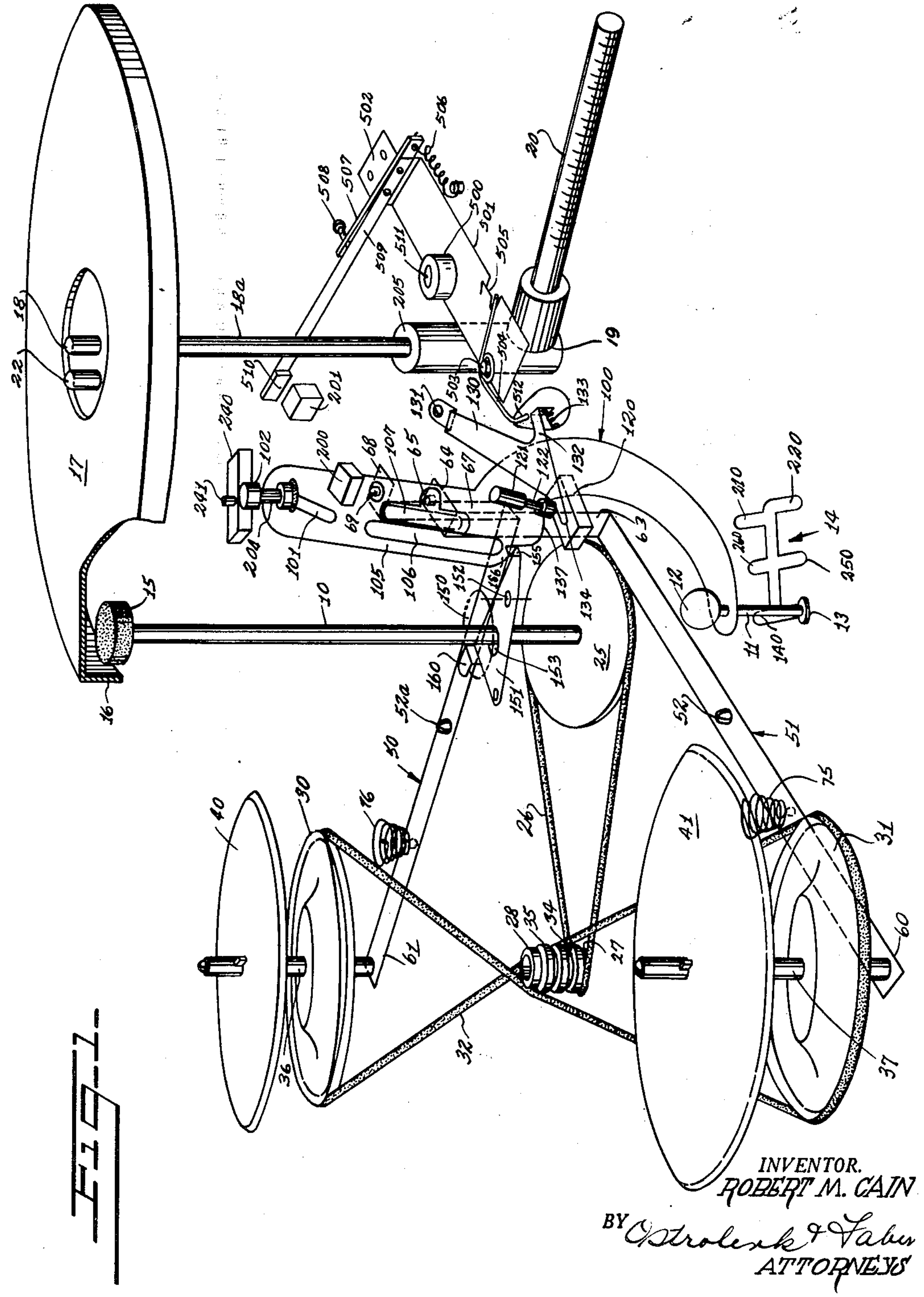
Figure 1 is a schematic view showing the elements of my novel device in the "at rest" or off position.

Referring first to Figure 1, the mechanism is here shown in the "at rest" or "off" position. It should also be noted that there are here shown primarily the mechanical operating elements and details.

An electric motor (not shown) may be flexibly mounted by rubber grommets in the manner described in Patent No. 2,351,948 so that the motor as a unit may shift slightly in a horizontal plane.

When the instrument is turned on, the electric motor is prepared to operate so that it may rotate the triple grooved driver pulley 28. An elastic belt 26 is lodged in groove 27 of driver pulley 28 and encircles a groove in driven pulley 25.

Although the unit may be turned to the on position electrically as long as the mechanical elements of Figure 1 are in the "at rest" position there shown with the indicator pin 11 and knob 12 in recess 13 of the indicator slot 14, none of the elements operate although they are ready to do so.

The driven pulley 25 and friction wheel 15 are both rigidly mounted on shaft 10. Shaft 10 as above pointed out rotates and, therefore, rotates the friction wheel 15 which is preferably a small rubber tired wheel keyed thereto. Friction wheel 15 is, however, disengaged from the flange 16 of turntable 17 so that the friction wheel 15 in the position of Figure 1 with the indicator 11 in recess 13 imparts no motion to the turntable 17. Turntable 17 is connected to the rotatable spindle 18 in such manner that when the turntable 17 rotates, it rotates the spindle 18. Spindle 18 is extended below the turntable 17 in the shaft **18*a* down to the gear box 19 where through appropriate gear connections not shown it is connected to the horizontal screw 20**.

By this means, when the turntable 17 is rotated, it results in appropriate synchronous rotation of the screw 20 in order to drive a disc recording arm and its stylus over a record blank on the turntable 17 exactly in accordance with the principles set forth in Patents Nos. 2,351,948 and 2,310,229.

An appropriate pickup may also be provided for a recorded disc on the turntable 17, the said pick-up being independent as in Patent No. 2,351,948 or constituting the same arm as the cutting arm but occupying a different position when acting as a pick-up as described in Patent No. 2,310,229. Likewise as described in each of the above cited patents, an eccentric pin 22 may be mounted on the turntable, the said pin being spring biased upwardly but depressible to a point where it is level with the turntable and cooperating with an appropriately spaced eccentric hole on an instantaneous recording disc to ensure a proper driving connection between the turntable and the instantaneous recording disc.

Driver pulley 28 is also connected to the supply operating pulley 30 by the continuous crossed belt 32 which preferably is an elastic band, the said belt crossing at pulley 28 and being guided to avoid rubbing friction between the crossing parts of the belt by grooves 34 and 35 of pulley 28. The belt 32 is so crossed that pulley 31 is driven in the same direction as pulleys 25 and 28 while pulley 30 is driven in the opposite direction.

Pulley 30 rotates freely about the vertical bushing 315 (see also Figure 7) through which passes shaft 36. Pulley 31 rotates freely about a corresponding vertical bushing through which passes shaft 37. The tape supply platform 40 is mounted on sleeve 321 keyed to shaft 36. The tape take-up platform 41 is mounted on a corresponding sleeve keyed to the shaft 37. Shafts 36 and 37 are vertically slidable with respect to the pulleys 30 and 31.

The clutches hereinafter described are provided between pulley 30 and supply platform 40 on the one hand and pulley 31 and take-up platform 41 on the other hand, the said clutches being so arranged that when the shafts 36 and 37 are raised, the clutches are disengaged and when the shafts 36 and 37 are lowered, the clutches are engaged.

For the purpose of the present description with respect to Figures 1 to 6, the fact that raising shafts 36 and 37 disengages the clutches and lowering these shafts engages their respective clutches is all that need be known. The clutch construction which produces this result will be described in connection with Figures 7 and 8.

Clutch operating levers 50 and 51 are provided, lever 50 being connected to operate the clutch for the supply mechanism 30–36–40 and lever 51 being provided to operate the clutch for the take-up mechanism 31–37–41. The lever 51 is pivotally mounted by the snap button 52 (see also Figure 8) in bracket 53 connected to bottom frame 54 which in turn is supported in any suitable manner as by a plurality of posts 55 from the base plate 56 of the machine.

The lever 51 may rock in a vertical plane about the button 52 but is not intended to have any horizontal component of motion. The clutch operating lever 50 is similarly supported for pivotal operation in a vertical plane around the button 52*a*. Clutch operating lever 51 has a forward extension 60 underlying the shaft 37. Clutch operating lever 50 has a forward extension 61 underlying the shaft 36.

Clutch operating lever 51 at its rear has an upwardly directed extension 63 to which is connected an additional horizonal extension 64, the said extension underlying the base plate 56 and being provided with an upwardly projecting pin 65. Similarly the clutch operating lever 50 at its rear has an upwardly directed extension 67 connected to a horizontal extension 68 on which is mounted the upwardly directed pin 69. The pins 65 and 69 project upwardly through a slot 70 in the base plate.

Figure 8:
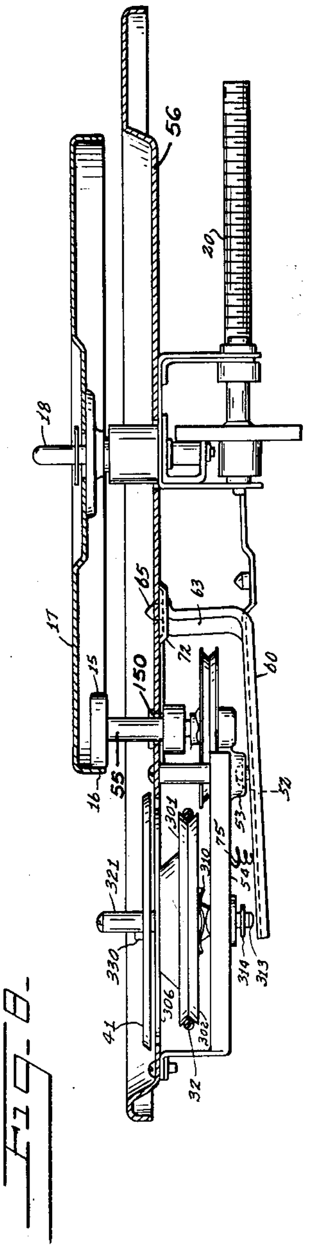
Figure 8 is a cross-sectional view showing the operating lever and associated parts.

As best seen in Figure 8, a bracket 72 is provided surrounding the slot 70 and limiting the upward movement of the ends 63 and 67 of the levers 51 and 50 by the engagement of the extensions 64 and 68 against the under surface thereof. Bracket 72 may also be provided with appropriate openings adapted to receive the pins 65 and 69, thereby preventing any lateral rotation of the levers 50 and 51.

Compression spring 75 is provided for lever 51 between its pivot 52 and its end 60 biasing the said end 60 downwardly. Compression spring 76 is provided for lever 50 between its pivot 52*a* and its end 61 biasing that end downwardly. Therefore, the pins 65 and 69 are biased upwardly to a point where the horizontal extensions 64 and 68 of the respective levers bear against the under surface of bracket 72 and the pins 65 and 69 tend to project up above the surface of the base plate 56.

A main operating lever 100 is provided, the said lever being pivotally and slidably mounted by the engagement of its slot 101 with the pin 102 on the base plate 56. The lever 100 carries on its rear area adjacent the inner end of slot 101 the erasing magnet 200 described in my copending application Serial No. 158,637 filed April 28, 1950. Lever 100 has two upwardly extending embossed sections 401 and 402 (see Figure 2).

When the parts are in the position of Figure 1, the projecting pins 65 and 69 are protruding into these upwardly embossed sections 401, 402 of lever 100 so that levers 50 and 51 remain in their most counterclockwise position. Hence, the clutches of supply and take-up reels are engaged. Since the pulleys 30 and 31 are not being driven, engagement of the respective clutches of these pulleys will permit easy threading of the tape on the machine.

Figure 7:
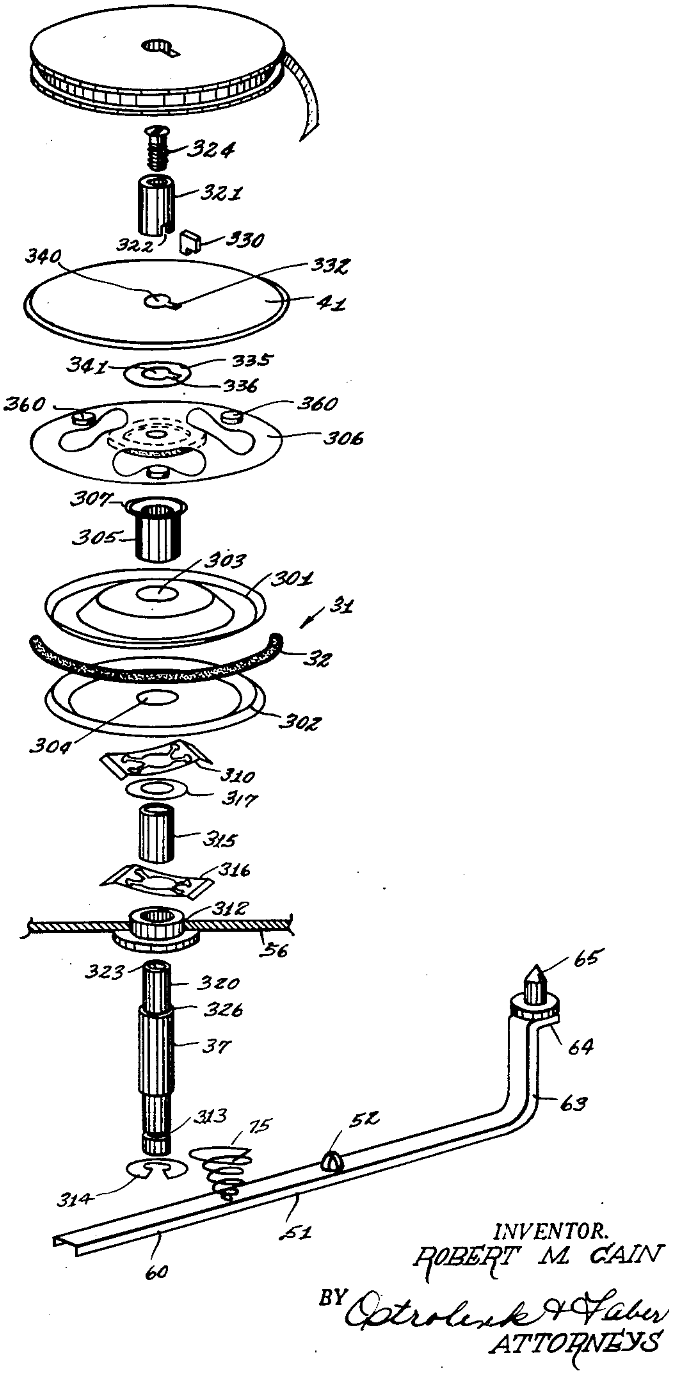
Figure 7 is an exploded view of one of the reels with its associated clutch elements.

In the position of Figure 8 the clutch elements hereinafter described in connection with Figure 7 are engaged to drive the particular supply or take-up reel or both as the case may be.

Figure 2:
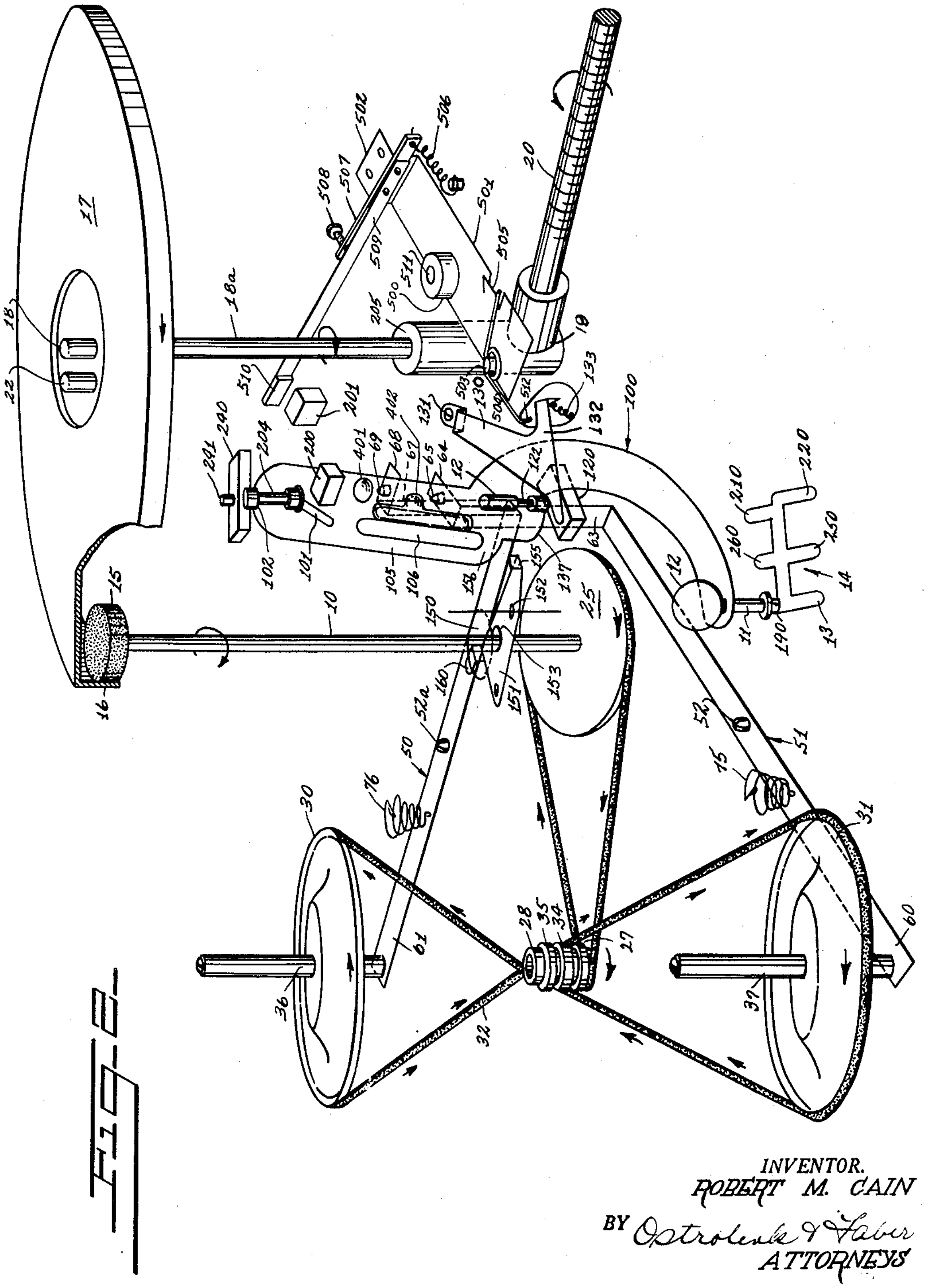
Figure 2 is a schematic view showing the elements of my novel device in the record disc operating position for playing or recording on a record only with the tape inoperative.

In the condition of Figure 2, the clutch elements are disengaged and in order to accomplish this result, shafts 36 and 37 must be raised. In order, however, to raise shafts 36 and 37, the ends 60 and 61 of levers 51 and 50 must be raised or upwardly rotated against the tension of springs 75 and 76 about the pivots 52 and 52*a*. In order that this result be accomplished, the upwardly projecting pins 65 and 69 must be depressed.

The lever 100 may rotate about the pin 102 and it may slide longitudinally with respect thereto over a path defined by the slot 101. The free movement of the lever 100 is however, limited by reason of the fact that its front end carries the indicator knob 12 and pin 11 which pass down and engage in the stationary indicator slide 14 having the "at rest" recess 13 and the other recesses hereinafter described.

Thus, the operating lever 100 can only be moved to the six positions determined by the various recesses in the indicating slot 14, each of the said positions corresponding to a specific operation which the operating cam 100 is to control.

The operating cam lever 100 has a main operating section 105 which generally overlies the pins 65 and 69. The main operating section 105 can be moved to a position where its flat surface overlies the pin 65 and pin 69. When the operating lever 100 is parallel to and moves over the top surface of the base plate 56 which pushes down the pins 65 and 69 thereby depressing the rear ends of levers 50 and 51 and raising the ends 60 and 61 of levers 51 and 50 to raise the shafts 37 and 36 to disengage the clutch members for the platforms 40 and 41, these platforms will not be driven by the pulleys 31 and 30.

The main operating section 105 of the operating lever 100 is provided with a longitudinal cut-out slot 106 communicating with a raised or upwardly embossed parallel section 107. When the main operating lever 100 is moved to a position where either the upwardly embossed section 107 or the slot 106 or upwardly embossed sections 401 and 402 register with either of the pins 65 or 69, then the compression spring 75 or 76 as the case may be of the associated clutch lever 51 or 50 is permitted to rotate the clutch lever 51 or 50 so that its end 60 or 61 as the case may be is lowered.

This will result in a lowering of the associated shaft 37 or 36 and an engagement of the associated clutch to operate the associated reel. The direction of operation of the reel is predetermined at all times by the assembly of the mechanism and this is not changed. The rotation of the reel or its being stopped is determined by the position of the operating lever 100.

Thus, it will be seen that the movement of the operating lever 100 so that the pins 65 and 69 underlie the flat section 105 of lever 100 will result in no movement of the reel platforms 40 and 41. When the operating lever 100 is moved so that pin 69 underlies upwardly embossed sections 107, 401, 402 or the slot 106 of the operating lever 100, the reel platform 40 will be rotated. When the operating lever is moved so that pin 65 underlies embossed section 107 or slot 106 of the operating lever 100, then the reel 41 will be rotated.

The machine is so constructed as hereinafter described that either of the two clutches may be operated alone or simultaneously in accordance with the position of the operated lever 100.

All of the mechanical positioning of the various parts is accomplished by movement of the indicator knob 12 to one of the six recesses in indicator 14. The electrical circuit of Figure 9 is arranged with manually and mechanically operated switches to select sources of input and receivers at output and combinations thereof for each mechanical setting of the indicator knob 12.

An electrical switch 120 is provided in series with the electric motor (not shown), the switch being so arranged that when it is open the motor is disconnected and when it is closed the motor is connected.

The switch 120 is biased towards open position and is provided with a rocking operating lever 121 so arranged that when the lever 121 is swung to the left with respect to Figure 1 by an external force, switch 120 will be closed, but when the external force is removed, the switch 120 will open.

In placing the tape 203 on the machine in the manner shown in Figures 3 to 6 as hereinafter described, the tape registers with the switch operating lever 121 and as long as the tape is taut, it pulls the lever 121 to the left closing the switch 120. When the tape 203 breaks or runs out, then the bias towards the left on the switch lever 121 is removed and the switch 120 may thus spring open, stopping the motor and preventing a snarling of the tape or unnecessary operation when the tape supply is exhausted or broken.

However, in those cases where the machine may be used temporarily to play back or record record discs alone on the turntable, the machine need not be at that time supplied with tape. Consequently, a means must be provided to hold the switch lever 121 in the closed position for switch 120 during the operation of merely playing or recording a record disc on turntable 17. This is accomplished by the lever 130 which is pivotally mounted at pin 131 on the base plate 56.

Lever 130 is provided with extension 132 to which is connected the tension spring 133 drawing the lever 130 in a clockwise direction around its pivot 131 and thereby driving the opposite extension 134 of the lever 130 against the switch operating lever 121 to hold it in the erect position or biasing it towards the left in order to close the switch 120.

Thus, in the "phono" or "record disc operating" position of Figure 2, the lever 121 is biased to the left against the tension of the internal opening spring of switch 120 by the spring 133 of lever 130 so that the motor will operate.

In the "at rest" position of the mechanism of Figure 1, the ledge 137 of the operating lever 100 bears against the left side of the switch operating lever 121, pushing it towards the right against the bias of the switch control lever 130 and its spring 133 so that the motor is off owing to the fact that the switch 121 for the electric motor is held open.

When the knob 12 and indicator 11 of the operating lever 100 are moved from recess 13 of indicator guide 14 (Figure 1) up to the end of recess 140 of indicator guide 14 and thus to the record playing position of Figure 2, the operating lever 100 and rear slot 101 are slid rearwardly along pin 102. The switch control lever 130 is biased so that its end 134 moves and holds lever 121 of switch 120 erect or towards the left so that switch 120 is closed and the motor is operated. During this movement the ledge 137 of operating lever 100 moves away from the left side of switch operating lever 121 so that the switch operating lever 121 may be held closed by the switch control lever 130.

At the same time it will be noted that the movement of the operating lever 100 has been such that pins 69 and 65 no longer project into embossed sections 401 and 402, and now underlie the flat portion of section 105 and are, therefore, depressed, thereby maintaining the ends 60 and 61 of levers 51 and 50 in raised position so that the reel platforms 40 and 41 are not rotating.

The driven operating shaft 10 for the turntable 17 passes through an opening 150 in the base plate 56. A shaft positioning lever 151 is pivotally mounted on the shaft 152 on the base plate and on the left side is provided with an opening 153 through which the shaft 10 passes. On the right side of pivot 152 the lever is provided with an upwardly directed extension 155 which may be engaged by the edge 156 of the main operating lever 100. The lever 151 is also supported for accuracy by a reentrant extension 160 thereof overlying base plate 56 at the edge of the opening 150.

The tension of elastic belt 26 urges the pulley 25 and shaft 10 to the left. The lever 151 is, therefore, provided with a bias, thereby tending to rotate the lever 151 in a counterclockwise direction about its pivot 152 forcing the driving wheel 15 on shaft 10 towards driving engagement with the flange 16 of turntable 17.

When the unit is in the "at rest" position of Figure 1, the ledge 156 of the operating lever 100 exerting a clockwise bias on lever 151 through extension 155 overcomes the tension of the belt 26 and drives the lever 151 to the position shown in Figure 1 where the shaft 10 is pushed to the right so that the drive wheel 15 is out of engagement with flange 16 of turntable 17. This disengagement between wheel 15 and flange 16 need only be a minute one of the order of 1/32 of an inch in order to defeat the drive.

When the operating lever 100 is moved so that indicator 11 and knob 12 move from recess 13 of guide slot 14 up to recess 140 of guide slot 14 as shown in Figure 2, not only does lever 130 place the switch arm 121 in closed circuit position for switch 120 as previously described, but the ledge 156 of the operating lever 100 moves out of engagement with extension 155 of lever 151 so that the tension belt 26 may rotate the lever 151 counterclockwise, thereby pushing the post 10 towards the left to a point where friction wheel 15 engages the flange 16 of turntable 17 to drive the turntable 17.

Thus, in the position of Figure 2 the turntable 17 alone is operated and the tape mechanism is not operated. A record may be played back or a record may be cut as desired.

When a tape supply reel 202 having the tape 203 is played on the reel platform 40, the tape 203 is threaded around pin 102, being received in the guide recess 204 of pin 102 and then around the recording and play back head 201 which is mounted on the base plate 56, then it passes around a capstan 205, then around the switch operating lever 121 and then to the takeup reel 207 on reel platform 41. Capstan 205 is keyed to the spindle shaft 18_a_ of spindle 18 and rotates with spindle 18 and spindle shaft 18_a_ as the turntable 17 rotates.

Figure 5:
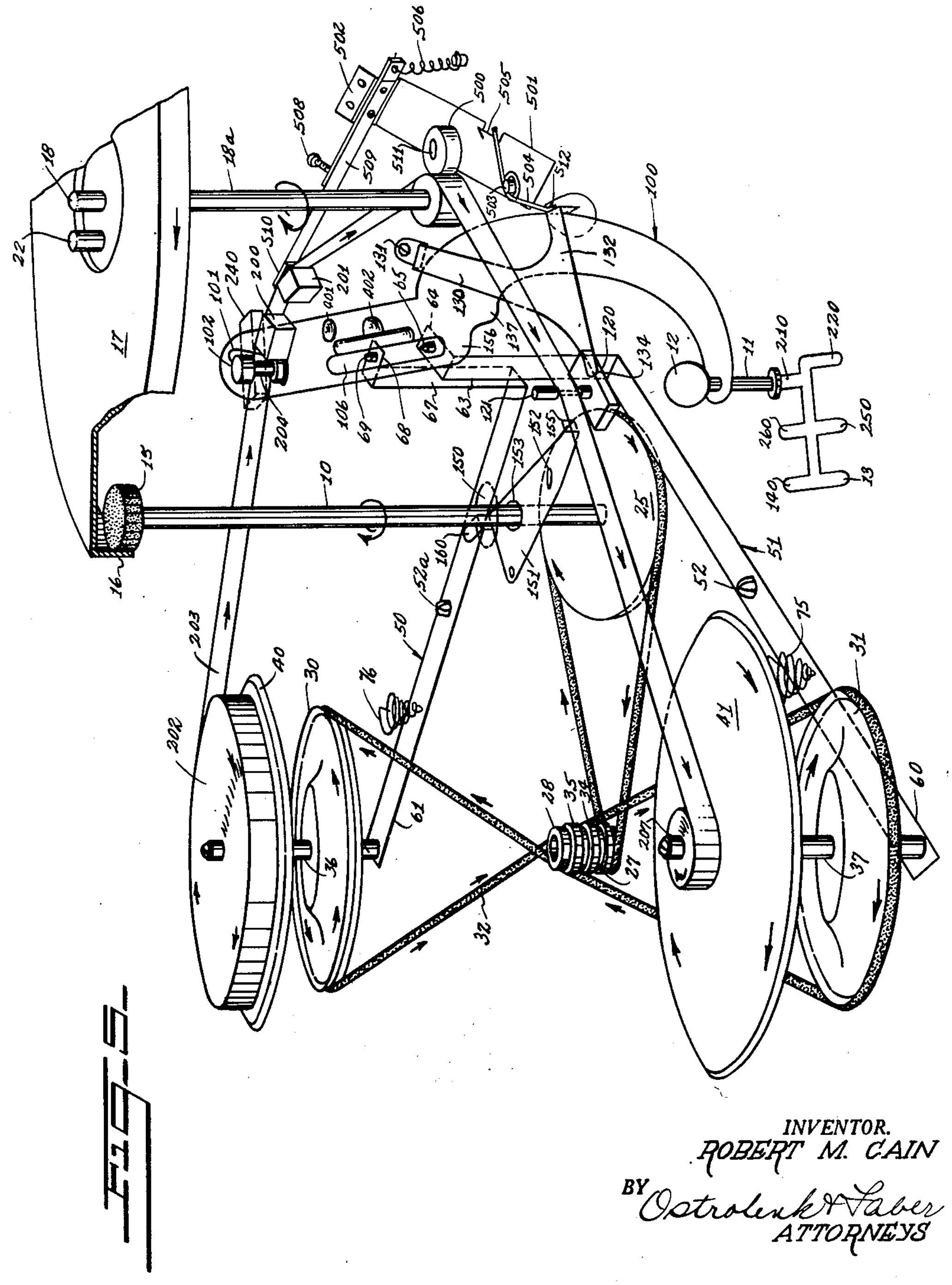
Figure 5 is a schematic view of my novel device showing the position of the elements for recording on the tape.

When it is desired to record on tape, the lever 100 is moved to the position of Figure 5. This is accomplished by moving the knob 12 and indicator 11 in the guide slot 14 until the indicator 11 comes to rest in recess 210 of the guide slot 14.

The operating lever 100 is thus moved backwards and to the right, the slot 101 in operating lever 100 surrounding the lower extension of pin 102 permitting this rearward and pivotal movement. At the same time, the eraser magnet 200, which is mounted on the rear area of lever 100, is moved into contact with the tape 203.

At this time it will be seen from Figure 5 that the cam slot 106 of operating lever 100 has moved into registry with the pins 65 and 69 of levers 50 and 51 and compression springs 75 and 76 of levers 51 and 50 now move the ends 60 and 61 of these levers downwardly around their pivots 50 and 52_a_, pushing their respective pins 65 and 69 up into the slot 106. This, as previously described and as will be hereinafter more fully explained in detail, engages the clutches, also hereinafter described, to provide a frictional drive from pulleys 37 and 36 to reel platforms 41 and 40 so that these platforms will rotate in opposite directions, the reel platform 40 rotating counterclockwise and the reel platform 41 rotating clockwise imparting a tensioning force on the tape 203.

This tensioning of tape 203 drives the tape into close frictional engagement with the rotating capstan 205 which is rotating in a clockwise direction. Thus, since the reel platforms 40 and 41 substantially balance each other, they result only in tensioning the tape, the slipping or frictional engagement of the clutches preventing the application of sufficient force to tear the tape.

To make the aligning of the tape against the face of the recording head 201 less critical, a pressure pad 510 is incorporated. A pinch roller 500 is provided to prevent slipping of the tape on the capstan 205.

The pressure pad 510 and pinch roller 500 come into operative position when the shift lever 100 is moved along the guiding slot into either the record tape (Figure 5) or the play back tape (Figure 6) positions; in all other positions the pressure pad 510 and pinch roller 500 are away from the tape recording head 201 and the capstan 205.

This action is brought about by the leg 512 of torsion spring 504 being contacted and moved by the outer edge of shift lever 100. This torsion spring 504 overrides the relatively weaker return spring 506 and moves the plate 501 which carries the pinch roller 500, the pressure pad arm 509 and the guard (not shown) toward the capstan 205 and tape recording head 201, respectively. Before the shift lever 100 moves into its final position in either play back (Fig. 6) or record (Fig. 5), the pinch roller 500 is in contact with the tape 203 and capstan 205 and the pressure pad 510 is in contact with the tape and recording head 201.

The pressure pad 510 mounted on the spring arm 509 is adjusted to provide pressure against the tape when in place in the tape recording head 201 by means of the adjusting screw 508 in the rigid arm 507 which is attached to the plate 501.

The guard (not shown) mounts to the surface 502 of plate 501. The purpose of the guard is to provide a ramp for the tape to climb over the pressure pad 510 and pinch roller mechanism 500 when loading or unloading tape. Since the pressure pad 510 and pinch roller 500 are retracted away from the tape recording head 201 and the capstan 205, the tape will climb up over this mechanism and then drop down to its normal position against the tape recording head 201 and the capstan 205.

The net forward motion of the tape 203 in the direction of the arrow of Figure 5 is thus a result of its frictional engagement with the rotating capstan 205 and pinch roller 500.

The tape thus moves at a constant speed as determined by the speed of rotation of capstan 205 and this forward movement is maintained at a smooth unvarying pace by the flywheel effect of the turntable 17. Thus, the problems of variations in diameter of supply and take-up reels resulting in possible variations in speed of the tape are obviated since the supply and take-up rolls are rotated in opposite directions solely to tension the tape and clockwise rotation of the take-up roll has no net forward effect on the tape but acts solely to wind up that portion of the tape which is fed to it by the rotating capstan 205.

The lever 151 is pulled by the tension of belt 26 to the position of Figure 5 to drive the shaft 10 and drive wheel 15 against the flange 16 of turntable 17, the ledge 156 of lever 100 having been removed from extension 155 of lever 151 as shown in Figure 5. Likewise the right side or curve of operating lever 100 has engaged an extension 132 of switch control lever 130 moving its end 134 away from the switch lever 121 so that the switch lever 121 is held erect to close the switch 120 solely by the tension of tape 203.

Thus, when the tape 203 runs out or breaks while the apparatus is in the tape recording position of Figure 5, the release of tension on switch lever 121 will permit it to move back to the right to the open position of switch 120, thereby immediately stopping the motor.

Since the erasing magnet 200 precedes the recording magnet 201 during movement of the tape, the erasing magnet 200 will erase whatever noise or recording has appeared on the tape just prior to the recording of the particular desired selection on the tape. The erasing magnet 201 as shown by a comparison of all the figures is moved into engagement with the tape only when the operating lever 100 is moved so that the knob 12 and indicator 11 enter the recess 210 of the indicator guide or slot 214.

Thus, where it is desired to erase a tape without recording thereon, it is only necessary to move the operating lever to the position 210 of Figure 5 and turn the mechanism on. The recording on the tape will be erased and no new recording will be placed thereon unless energy is supplied to the recording magnet 201 either from a microphone, from a radio or from a record on a turntable 17.

With the unit in the tape recording position of Figure 5, it will be noted that the turntable 17 is rotated. Consequently, a record may be placed on the turntable 17 and the pick up arm may be connected to the recording magnet 201 so that the record on turntable 17 may be copied onto the tape 203. This provides a simplified record copying arrangement.

As is well known, appropriate connections may be made from the microphone through an amplifier to the recording magnet 201 and similarly appropriate connections may be made from the output of a radio receiver to the recording magnet 201 as will hereinafter be described in connection with Fig. 9. The erasing magnet 200 is preferably a permanent magnet appropriately designed to erase or randomize whatever magnetic impressions had previously been placed on the tape.

Figure 6:
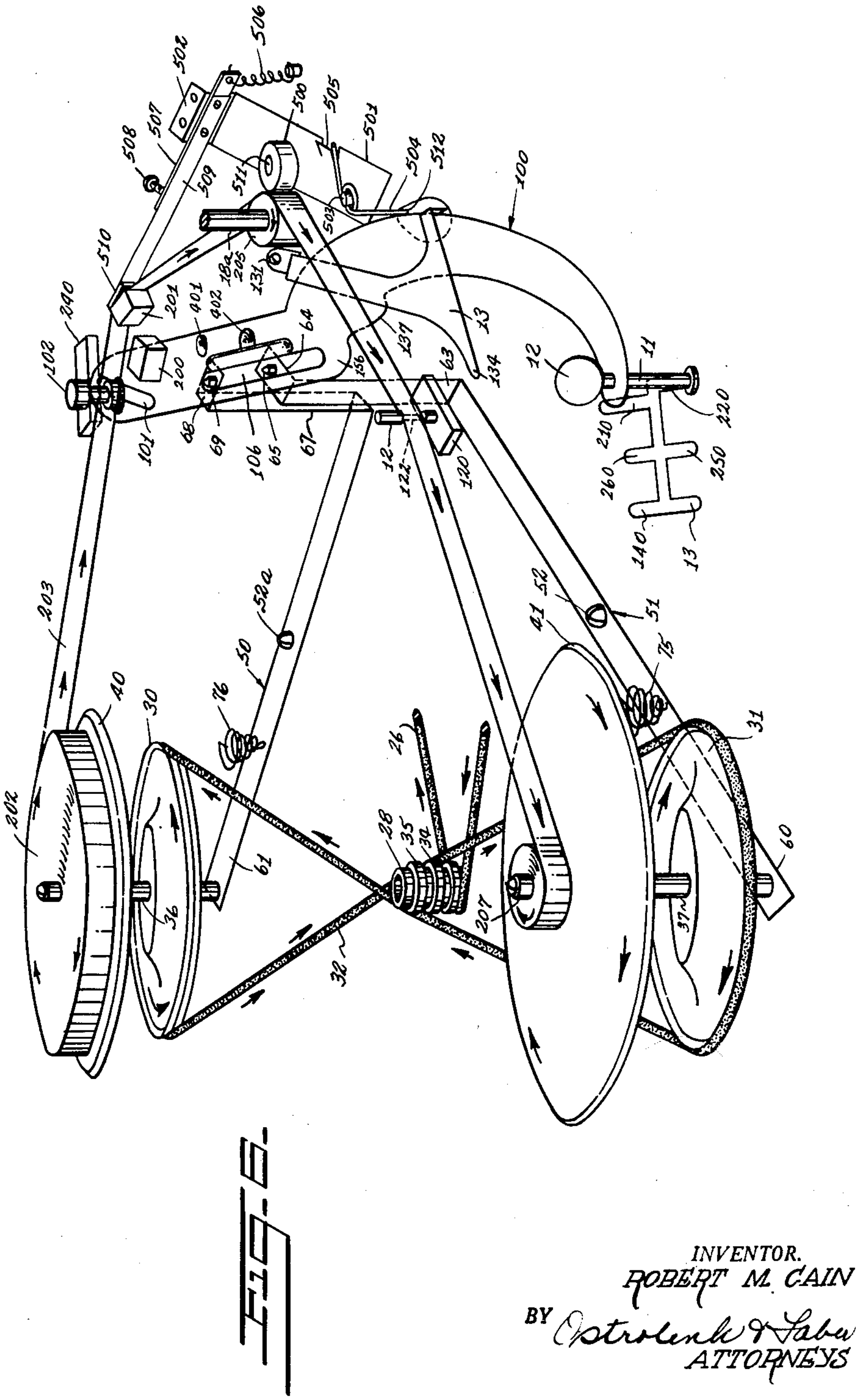
Figure 6 is a schematic view of my novel device showing the position of the elements for playing back the tape.

In Fig. 6 I have shown the position of the elements to play back a recorded tape. The operating lever 100 has been moved so that its knob 12 and indicator 11 are in the end of recess 220 of the indicator and guide slot 14. All mechanical elements are in the same condition as in the recording position of Fig. 5 with the sole exception that the forward movement of operating lever 100 has moved the erasing magnet 200 out of engagement with the tape. The turntable 17, capstan 205, the tape reels 202 and 207, switch 120, pinch roller 500, pressure pad 510 and all other elements operate in exactly the same position. The slot 106 and operating lever 100 is long enough so that pins 65 and 69 of levers 51 and 50 still remain in registry therewith, thereby providing the tensioning arrangement hereinbefore described.

The magnet 201 in this case acts as a play back magnet and may be connected through appropriate amplifying means to suitable audio apparatus or it may simultaneously or independently be connected to a record cutting arm cooperating with a blank record disc on turntable 17 so that the impressions on the tape may be copied on the blank record.

It will be obvious that the movement of lever arm 100 may by appropriate mechanical means be arranged to operate various switching devices in accordance with the position of the operating arm 100. Thus, when the operating arm 100 is in the tape recording position of Figure 5, it may operate an appropriate switch connecting either a microphone, a radio or the pickup arm for turntable 17 to the recording magnet 201.

The device may normally be arranged so that it will connect the stylus and microphone simultaneously to the recording magnet providing feed back protection is arranged for, an additional manually operated switch being provided to connect a radio receiver to the recording magnet 201. Or an independent switch may be provided to be manually operated by the user to arrange for these connections as noted in Fig. 9.

Thus, if desired, the circuit may be arranged so that the user in addition to making the manual shifts required of knob 12 for operating lever 100 may also operate manually two other switches, one of which may be marked "Input" or "From" (1) radio; (2) microphone; (3) turntable; (4) tape; and the other of which may be marked "Output" or "To" (1) speaker; (2) turntable; (3) tape.

The electrical circuit of Figure 9 illustrates the manner in which the input switch 515 and output switch 516 are connected to the circuit.

The blades 517*a* and 517*b* of input switch 515 are ganged together so that these blades contact terminals 520*a* and 520*b* or 521*a* and 521*b*, etc., respectively and has four selective positions. In the position of Fig. 9, the blades 517 contact terminals 520 and connect the microphone 518 to the input of amplifier 519. When blades 517 contact terminals 521 the record disc is connected to the input; at 522 the source at the auxiliary jack 520 will be fed into the amplifier; at contact 523 the information on the tape will be the input energy for the amplifier 519. The output switch 516 has the three selective positions to tape at 522, to disc at 521 or speaker at 523. When the machine operator has placed the apparatus in any one of the six positions at indicating slot 14 the electrical circuit can be controlled by switch 515 and 516 to select the source of input and receiving apparatus desired.

The switch 240A shorts out the coil of the recording head 201 through the switch 515 to ground in all positions except record. Note, however, that when switch 515 is in play tape position, arm 517–A is on contact 523A which is not connected to switch 240; therefore, the head 201 is not shorted when both the mechanical unit and the switch 515 are in the play tape position.

The purpose of this arrangement is to prevent accidental recording on the tape in any other position except record tape (Figure 5).

In Figures 1 to 6, I have shown the switch member 240 mounted beneath the base plate 56 and so arranged that the rear end of the operating arm 100 may engage the switch operator 242 in accordance with the position thereof to operate the switch. Switch 240 may be a two-way switch so that, for instance, when the arm is in the position of Figures 5 and 6, the switch will be closed and when the operating arm 100 is in the position of any of the other figures, the switch will be open.

It will be obvious that various switches may be arranged around the operating arm 100 to be engaged at different positions of the operating arm 100 to effect the various operations of the mechanism.

It will thus be clear that the single composite unit may be utilized to record on tape from any source including copying a record on turntable 17 onto the tape and the device may also be used to play back the tape to any outlet including the copying of the tape recording on a record blank placed on turntable 17.

At times, it may be necessary to move the tape rapidly in a forward direction in order to quickly reach a portion of the tape on which it is desired to make a record or to play back. For this purpose, it is necessary to provide a means for rapidly winding up the tape on to the take up reel 207 on take up reel platform 41.

Figure 4:
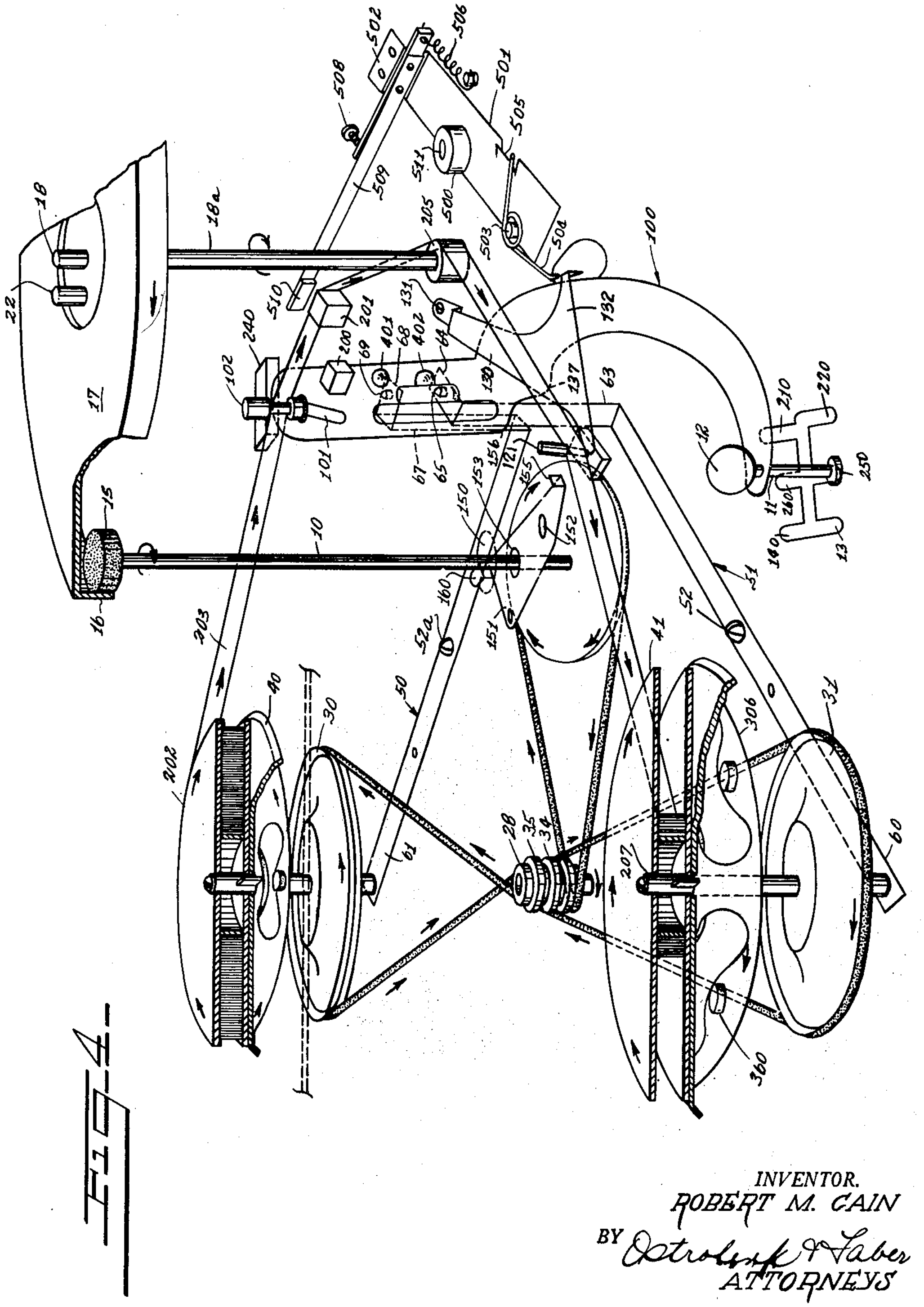
Figure 4 is a schematic view of my novel device showing the position of the elements for a rapid forward motion or wind-up of the tape.

For this purpose, the operating lever 100 is moved so that knob 12 and indicator 11 register in slot 250 of guide slot 14 as shown in Figure 4. This moves the erasing magnet 200 away from the tape and also moves the lever 100 so that pin 69 for clutch lever 50 moves under the flat section 105 of the operating lever 100, thereby disengaging the connection between pulley 30 and supply platform 40 so that supply platform 40 is free to rotate in any direction.

However, pin 65 as seen in Figure 4 moves under the raised upwardly embossed section 107 of operating lever 100 so that end 60 of lever 51 is raised maintaining the clutch engagement for take up platform 41 and take up reel 207.

Thus the take up reel 207 rotates at the full speed of pulley 31 without any hindrance whatever and rapidly winds up the tape 203. This continues until either a desired portion of the tape is reached or until the tape is fully found up on reel 207.

Figure 3:
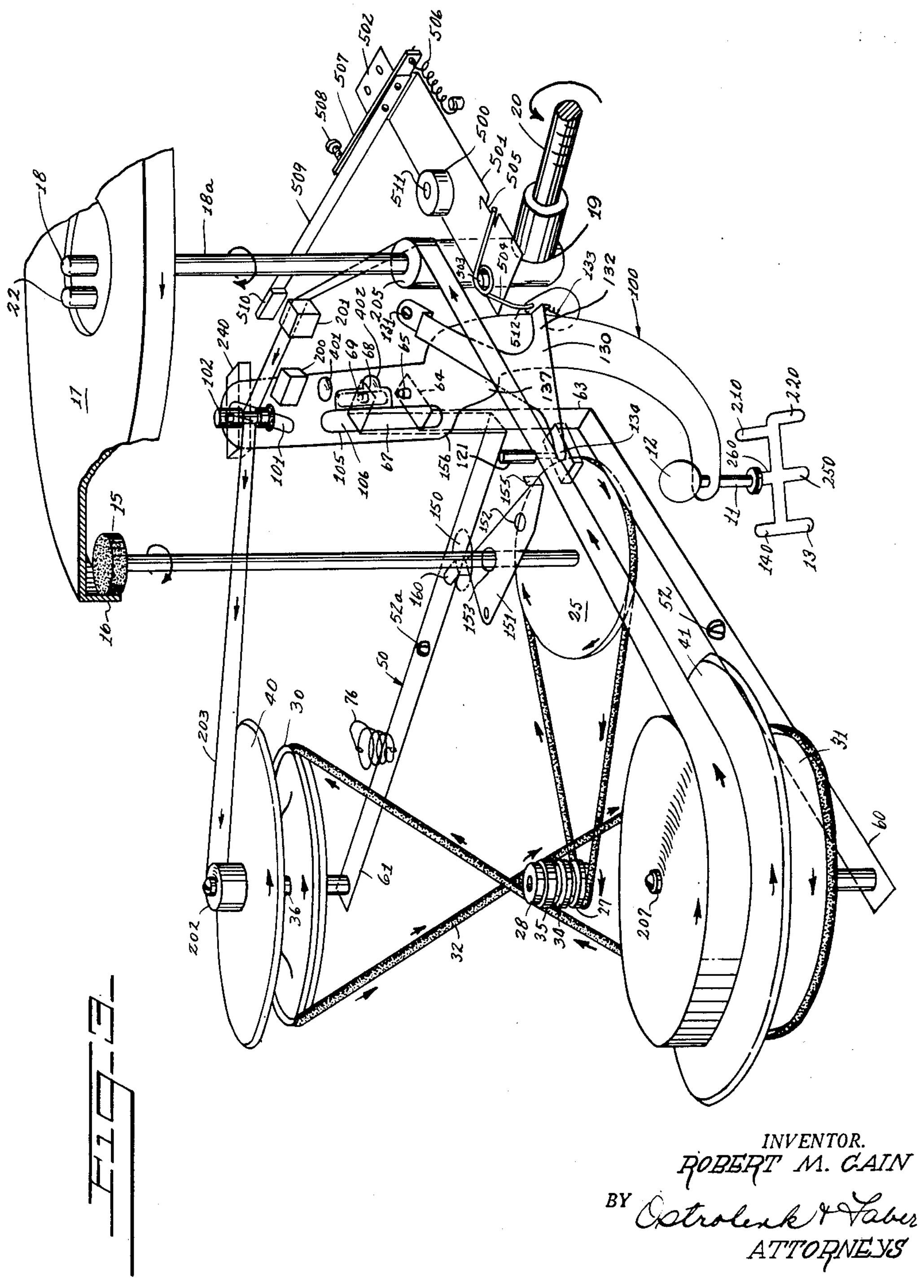
Figure 3 is a schematic view of my novel device showing the position of the elements for a rapid rewind of the tape.

As seen in Figure 3, after the tape has been fully recorded, to play back the tape it is necessary to re-wind the same or it may be desired at times to go back to an earlier portion of the tape. For this purpose, the operating lever 100 of knob 12 and indicator 11 registers with recess 260 of the indicator and guide slot 14 as seen in Figure 3.

Again, it will be seen that the erasing magnet 200 no longer engages the tape 203. Pin 65 of lever 51 has been moved under the flat section 105 of operating lever 100 so that pulley 31 is disconnected from take up reel platform 41 and take up reel 207; and take up reel 207 may now rotate freely in any direction.

However, pin 69 is moved under the upwardly embossed section 107 of the operating lever 100 so that the end 61 of clutch lever 50 moves down, thereby engaging the supply reel platform 40 with the pulley 30. Supply reel 202 and its platform 40 may now rotate at full speed without any hindrance in a clockwise direction to rewind the tape rapidly.

Summarizing, in the "at rest" position of the mechanism shown in Figure 1 with the operating lever 100 and its knob 12 and indicator 11 in slot 13 of the indicator and guide slot 14, the entire mechanism is at rest; friction wheel 15 is disengaged from flange 16 of turntable 17, the ends 60 and 61 of clutch levers 51 and 50 are raised, connecting the reel platforms 40 and 41 to their respective clutches, the ledge 137 of operating lever 100 bears against switch lever 121 of switch 120 to maintain the motor disconnected.

When the indicating knob 12 is moved to slot 140, the lever 100 is moved to the position of Figure 2 and although the turntable 17 is connected for rotation, the tape reels remain disconnected. Lever 130 in this position holds the operating lever 121 of switch 120 in closed position so that the motor may operate the turn table so as to play or record on the turn table alone.

When the operating lever is moved so that its knob 12 and indicator 11 are in recess 210 of guide slot 14 (Fig. 5), then both reels are connected for frictional drive in opposite directions to tension the tape, the turn table is connected mechanically so that the capstan 205 frictionally drives the tape, and the tape, by bearing against switch lever 121, maintains the motors in operating condition until the tape runs out or breaks.

Similarly when the operating lever 100 is moved to recess 220 of indicator and guide slot 14 in the position of Fig. 6 in order to play back the tape, the turn table is connected, the supply and take up reels are connected in the same manner as in Figure 5, the erasing magnet 200 which had been in engagement with the tape during the tape recording operation is moved out of engagement with the tape, all other elements of the mechanism being in substantially the same position as for recording.

For rapid forward movement of winding up of the tape the operating lever 100 is moved to recess 250 of Fig. 4, where the take up reel 207 is connected to be rotated while the supply reel 202 is disconnected for free rotation. The tape may thus be wound up in a forward direction very rapidly.

When it is desired to re-wind the tape, the operating lever 100 is moved to recess 260 of the indicator and guide slot 14 as seen in Fig. 2, and the supply reel 202 is connected by counterclockwise rotation while take up reel 207 is disconnected for free rotation so that the tape may be wound up rapidly.

In Figs. 7 and 8 I have shown one form in which the clutch mechanism hereinabove described in connection with the take-up pulley 31 and take up reel platform 41 on the one hand and supply pulley 30 and supply reel platform 40 on the other hand may be used.

The lever 51 or 50 are the case may be, is shown at the lower portion of the figure. The operation of this lever is obvious and has been described. The pulley 31 consists of a pair of flanged discs 301—302, the flange of which provides appropriate recess for the belt 32. The central openings 303—304 of the pulley discs 301—302 are secured to the bushing 305 by means of the spring clip 310. Pulley 31 revolves on bearing 315 which is pressed into bushing 312. This bearing assembly is mounted to the sub-base by means of the spring clip 316. Washer 317 is provided between the top of bushing 312 and bushing 305.

The central section of shaft 37 passes up through and is freely rotatable in the sleeve or bushing 315. The upper end of shaft 37 is recessed at 320 to receive and mount the sleeve 321 having the key slot 322 therein. The upper end of shaft 37 is tapped at 323 to receive the screw 324, the head of which holds the sleeve 321 in place on the ledge 326. Key 330 held in the key-way 322 engages the reel platform 41 which surrounds the lower end of recessed portion 320 of the shaft 37. The key 330 enters into the key-way 332 of platform 41 keying the platform 41 to the shaft 37. Washer 335 with its key-way 336 is provided beneath the reel platform 41 engaging the ledge 326. Openings 340 and 341 in platform 41 and washer 335 respectively, fit just over the recessed extension 320 of shaft 37 so that these elements rest on ledge 326. Sleeve 321 then clamps against the upper surface of platform 41 to secure to the shaft 37. Shaft 37, which carries the reel platforms 40 or 41 revolves inside bearing 315. The lower end of shaft 37 is provided with a recess 313 receiving the spring clip 314 which prevents the accidental lifting of the shaft 37 out of the bearing 315.

Note, Fig. 8 should be referred to simultaneously with Fig. 7 for a full understanding of the operation of the clutch.

Reel pans 41 are caused to revolve by means of friction on the lower surface to the clutch pads 360 which are mounted on the top of the clutch plate 306. This clutch plate assembly is driven by reason of its connection to the pulley 31.

It will thus be seen that the pulley 31 with the bushing 305 rotates around the outer section of bearing 315 while the shaft 37 carrying the reel platform 41 rotates in the inner section of bearing 315, this platform being frictionally driven by the clutch plate assembly as described above.

Inasmuch as the reel platform is driven only when there is a downward pressure on the clutch pads 360, it is only necessary to remove this pressure to remove the driving force. This is accomplished by raising the shaft 37 which carries the reel platform 41, by means of the end 60 of lever 51. This lifts the reel platform 41 away from the pads 360 of the clutch plate 306 so there is no driving connection between the clutch 306 and the reel platform 41.

When the end 60 of lever 51 is lowered shaft 37 may drop down until the under side of reel platform 41 rests in frictional engagement with the felt pads 360 of the clutch plate 306 of which the bottom clutch pad 302 rests in frictional engagement with the surface 361 of the pulley 301. This results in frictionally driving the reel platform 41.

We have found that in order to ensure appropriate operation of the tape during recording or play back, that the take up reel platform 41 be driven by a large area of pad 360 on the clutch plate 306 while the supply reel 40 be driven in the opposite direction by a smaller area of pad 360 on the clutch plate 306*a* in order not only to tension the tape appropriately but also to ensure the movement of the tape in the appropriate direction in the event that any unbalance in the clutch faces should occur through wear or as a result of other conditions.

While I have described and illustrated my invention in a preferred form of embodiment, it will be understood that such description and illustration are intended only for the purpose of explaining the principles of my invention, and that various modifications and changes may be made by those skilled in the art without departing from the essential spirit of the invention.

I desire, therefore that the appended claims shall be accorded the broadest construction consistent with their language and the prior art.

I claim:

1. In a sound recording and reproducing apparatus, a disc turntable, a tape supply means and a tape take-up means, driving means, apparatus control means and a base plate; said driving means comprising a motor, a driver pulley, a first driven pulley for said supply means, a second driven pulley for said take-up means, and a third driven pulley for said turntable, said first and second pulleys connected to said driver pulley by a continuous flexible belt, said belt imparting the opposite direction of rotation of said driver pulley to said first pulley and the same direction of rotation to said second pulley, said third pulley connected to said driver pulley by a second continuous belt, said second belt imparting rotation to said driven pulley in the same direction as the rotation of said driver pulley, said third pulley biased to permit frictional drive of said turntable; said tape supply and take-up means each comprising a said driven pulley, a clutch and a platform; said platform keyed to a shaft extending through the center thereof, said clutch and said driven pulley rotatably mounted on said shaft; said driven pulley, said clutch and said platform disposed in parallel planes and perpendicular to said shaft, said driven pulley imparting motion to said platform by means of said clutch; said apparatus control means comprising an operating cam lever, a switch lever, and a tape position and tension means, a tape supply clutch control lever and a tape take-up clutch control lever; said operating lever being slidably mounted on said base plate and adapted for manual control on said base plate and biased clockwise to engage and close a switch for said motor of said driver pulley; said clutch control levers biased counterclockwise to permit said first and second driven pulleys to drive said supply and take-up platforms respectively by means of their individual clutches and when said clutch control levers are rotated against their bias, said levers engage and raise said platform and keyed shaft to disengage said platforms from said clutch individual to it; said tape positioning and tension means comprising a pressure pad and pinch roller mounted on a member, said member being parallel to and pivotally mounted on said base plate and biased clockwise, said member when rotated against its bias bringing said pressure pad into engagement with a recording head mounted on said base plate and also bringing said pinch roller into engagement with a capstan of said turntable; said operating cam lever in a first of said predetermined positions engaging said switch lever to rotate same counterclockwise against its bias to thereby engage and open said motor switch and also engages said third driven pulley to rotate same against its bias to thereby prevent frictional rotation of said turntable; said operating cam lever in a second of said predetermined positions engaging said clutch levers to rotate same against their bias to thereby disengage said platforms from their said individual clutches; said operating cam lever in a third of said predetermined positions engaging said tape take-up clutch lever to rotate same against its bias; said operating cam lever in a fourth of said predetermined positions engaging said tape supply clutch lever to rotate same against its bias; said operating cam lever in a fifth of said predetermined positions engaging a downward projecting leg of said switch lever to rotate same against its bias, engaging said member to rotate same against its bias and moving an erasing magnet to a predetermined operative position; said operating cam lever in a sixth of said predetermined positions maintaining all the conditions of said fifth position except said erasing magnet is removed from said predetermined position to a non-operative position.

2. In a sound recording and reproducing apparatus, a disc turntable, a tape supply means and a tape take-up means, driving means, apparatus control means and a base plate; said driving means comprising a motor, a driver pulley, a first driven pulley for said supply means, a second driven pulley for said take-up means, and a third driven pulley for said turntable, said first and second pulleys connected to said driver pulley by a continuous flexible belt, said belt imparting the opposite direction of rotation of said driver pulley to said first pulley and the same direction of rotation to said second pulley, said third pulley connected to said driver pulley by a second continuous belt, said second belt imparting rotation to said driven pulley in the same direction as the rotation of said driver pulley, said third pulley biased to permit frictional drive of said turntable; said tape supply and take-up means each comprising a said driven pulley, a clutch and a platform, said platform keyed to a shaft extending through the center thereof, said clutch and said driven pulley rotatably mounted on said shaft; said driven pulley, said clutch and said platform disposed in parallel planes and perpendicular to said shaft, said driven pulley imparting motion to said platform by means of said clutch; said apparatus control means comprising an operating cam lever, a switch lever, and a tape position and tension means, a tape supply clutch control lever and a tape take-up clutch control lever; said operating lever being slidably mounted on said base plate and adapted for manual control to predetermined positions, said switch lever pivotally mounted on said base plate and biased counterclockwise to engage and close a switch for said motor of said driven pulley; said clutch control levers biased counterclockwise to permit said first and second driven pulleys to drive said supply and take-in platforms respectively by means of their individual clutches and when said clutch control levers are rotated against their bias, said levers engage and raise said platform and keyed shaft to disengage said platforms from said clutch individual to it; said operating lever in predetermined positions rotating either or both of said clutch control levers against their bias.

3. In a sound recording and reproducing apparatus, a disc turntable, a tape supply means and a tape take-up means, driving means, apparatus control means and a base plate; said driving means comprising a motor, a driver pulley, a first driven pulley for said supply means, a second driven pulley for said take-up means, and a third driven pulley for said turntable, said first and second pulleys connected to said driven pulley by a continuous flexible belt, said belt imparting the opposite direction of rotation of said driver pulley to said first pulley and the same direction of rotation to said second pulley, said third pulley connected to said driver pulley by a second continuous belt, said second belt imparting rotation to said driven pulley in the same direction as the rotation of said driver pulley, said third pully biased to permit frictional drive of said turntable; said tape supply and take-up means each comprising a said driven pulley, a clutch and a platform, said platform keyed to a shaft extending through the center thereof, said clutch and said driven pulley rotatably mounted on said shaft; said driven pulley, said clutch and said platform disposed in parallel planes and perpendicular to said shaft, said driven pulley imparting motion to said platform by means of said clutch; said apparatus control means comprising an operating cam lever, a switch lever, and a tape position and tension means, a tape supply clutch control lever and a tape take-up clutch control lever; said operating lever being slidably mounted on said base plate and adapted for manual control to predetermined positions, said switch lever pivotally mounted on said base plate and biased counterclockwise to engage and close a switch for said motor of said driver pulley; said clutch control levers biased counterclockwise to permit said first and second driven pulleys to drive said supply and take-in platforms respectively by means of their individual clutches and when said clutch control levers are rotated against their bias, said levers engage and raise said platform and keyed shaft to disengage said platforms from said clutch individual to it; said tape positioning and tension means comprising a pressure pad and pinch roller mounted on a member, said member being parallel to and pivotally mounted on said base plate and biased clockwise, said member when rotated against its bias bringing said pressure pad into engagement with a recording head mounted on said base plate and also bringing said pinch roller into engagement with a capstan of said turntable.

References Cited in the file of this patent

UNITED STATES PATENTS

| | | |
|---|---|---|
| 2,029,730 | Mallina | Feb. 4, 1936 |
| 2,110,484 | Hopkins | Mar. 8, 1938 |
| 2,181,112 | Herzig | Nov. 21, 1939 |
| 2,335,277 | Heller | Nov. 30, 1943 |
| 2,408,320 | Kuhlik | Sept. 24, 1946 |
| 2,419,476 | Begun | Apr. 22, 1947 |
| 2,513,423 | Owens | July 4, 1950 |
| 2,519,597 | Owens | Aug. 22, 1950 |
| 2,519,725 | White | Aug. 22, 1950 |
| 2,521,476 | Owens | Sept. 5, 1950 |
| 2,535,498 | Kornei | Dec. 26, 1950 |
| 2,539,858 | Offutt | Jan. 30, 1951 |
| 2,540,299 | Shoup et al. | Feb. 6, 1951 |
| 2,561,503 | D'Ornellas | July 24, 1951 |

FOREIGN PATENTS

| | | |
|---|---|---|
| 329,804 | Germany | Nov. 29, 1920 |
| 117,976 | Austria | June 10, 1930 |
| 253,290 | Sweden | Dec. 1948 |